April 18, 1967   L. A. BIESMA ETAL   3,315,198
COIL AND LEAD-IN WIRE CONNECTION
Filed April 1, 1965

INVENTORS
*LOUW ARJEN BIESMA*
*JAN MOERMAN*
BY

*Frank R. Trifari*
AGENT

United States Patent Office 3,315,198
Patented Apr. 18, 1967

3,315,198
COIL AND LEAD-IN WIRE CONNECTION
Louw Arjen Biesma and Jan Moerman, Drachten, Netherlands, assignors to North American Philips Company, Inc., New York, N.Y., a corporation of Delaware
Filed Apr. 1, 1965, Ser. No. 444,546
Claims priority, application Netherlands, Apr. 9, 1964, 6,403,784
4 Claims. (Cl. 336—192)

This invention relates to miniature electric motors and, in particular, to an improved connection between the lead-in wire and the free ends of the field coil wire.

In these miniature motors, the field coil wire is very fine, on the order of 0.1 mm. in diameter. As a result, the free ends of the coil to be connected with the much larger lead-in wire is fragile and must be free from stress and vibration.

The known practice for connecting the fine coil wire with a large lead-in wire is to connect the fine wire and the lead-in or a "whisker" wire via a soldering tag, pole shoe or the like, which is mounted on a fixed, rigid part of the motor mount or the device with which the motor is associated.

In accordance with this invention, the heavy lead-in wire is used as a post about which the fine, field coil wire is wrapped and soldered. The lead-in wire is associated with a lug, preferably integral with the coil former for the field coil, which lug is melted by the heat from the soldering operation and upon cooling the lug and wire are firmly united to prevent stressing the fine wire by vibration and otherwise.

According to a further aspect of the invention, the anchorage becomes even more firm by bending over the lead-in wire so that a hook is formed. According to a further aspect of the invention, this hook-like end may be subjected to a second terminal treatment in order to obtain a satisfactory anchorage in the synthetic substance.

According to another feature of the invention, a coil former suitable for carrying out the aforesaid method is characterized in that at least one of the flanges of the coil former is provided with one or more lugs which preferably have a shallow groove, the width of which is equal to or slightly smaller than the diameter of the end of the lead-in wire with the turns of the free end of the coil wire. This provides a suitable place for anchoring the connection with the coil former. The lug(s) may be made integral with the coil former, which is usually manufactured by molding of plastics.

The coil body is still more suitable for carrying out the method according to the invention, if according to a further aspect of the invention the lug is provided with an opening formed by two concentrically consecutive holes of different diameters, the larger of which is equal to the outer diameter of the connecting wire plus its insulation and the smaller diameter is equal to the diameter of the conductor per se and the lug is furthermore provided on two adjacent sides with a groove which, on one side, opens out into the hole for receiving the conductor.

The invention will be described more fully with reference to the drawing, which shows a few presently preferred embodiments of the invention and in which FIG. 1 is a side elevation of an inductor coil wound on a coil former with connecting wire and FIG. 2 is a front view of the coil former of FIG. 1.

Figure 1:
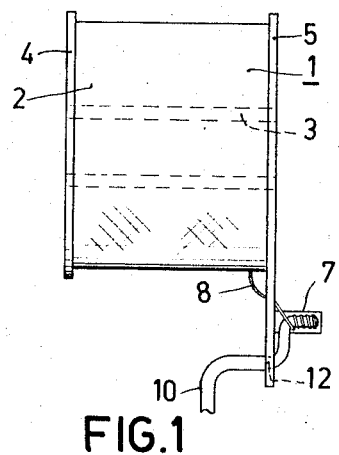
Figure 2:
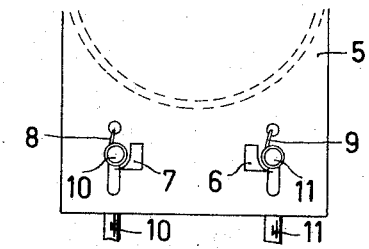

Referring to FIGS. 1 and 2, reference numeral 1 designates an induction coil having turns 2 of thin insulated copper wire of a diameter of 0.1 mm. These turns are located on a coil former of polycarbonate, a thermoplastic synthetic substance having a softening point of about 140°. The coil former consists of a body 3 of circular section and two end flanges 4 and 5. The flange 5 is provided with two lugs 6 and 7, which are made integral with the coil former by molding. The turns 2 have two free ends 8 and 9. Since the wire of the coil is fairly thin, it is weak and should not be subjected to tensile stress, since this also might damage the coil. The two thick insulated wires 10 and 11 are freed over a short distance from the insulating material and the metal core is then taken through the opening 12 having the same diameter as the core of wires 10, 11. Subsequently, also the ends of the coil terminals (are freed from the insulating material, if any) and the ends 8 and 9 are wound around the ends of the connecting wires 10 and 11 respectively. Then these wound ends are arranged in juxtaposition with lugs 6 and 7 respectively. When, by means of a hot soldering bit, the tin wire 8 and 9 is soldered to the thick wire 10 and 11 respectively, the heat supplied will soften the thermoplastic material of the lugs 7 and 8 respectively at least partly, so that after cooling the wire ends are embedded in the thermoplastic material, which provides a rigid assembly. Tensile force or even vibrations of the wire 10 and 11 will never be transferred to the thin wire 8 or 9 or to the winding 2. The coil former is preferably made of polycarbonate. However, thermoplasic substances may be employed, provided their softening point is not too low. It is preferred not to use thermoplastic substances which develop fluorine upon being heated. On the other hand, the softening point should not be too high.

Figure 3:
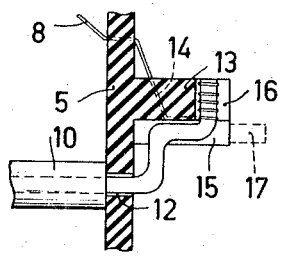
FIG. 3 is a partial side elevation on an enlarged scale of another embodiment of the connection between a coil terminal and a connecting wire.
Figure 4:
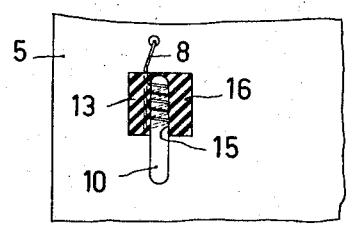
FIG. 4 is a front view of FIG. 3.

FIGS. 3 and 4 show, on an enlarged scale and partly in a sectional view, a further embodiment of coil former lugs. A lug 13 of rectangular section is provided with an opening 14 for the wire 8. The lower side of the lug 13 has a groove 15 and on the adjacent lateral side (front) a groove 16. The wire 10 is taken through the opening 12 in the flange 5 and is then bent over and again bent over to lay in groove 15. The end then projects from the lug 13, which is indicated by broken lines 17. The wire 8 is taken through the opening 14 and wound around said end 17, then the wound end of wire 10 is bent over so that it is disposed in the groove 16. When this end is soldered, the edges of the material forming the groove is softened and will enclose the end of the wire, so that upon cooling the wire is firmly anchored by the lug.

Figure 5:
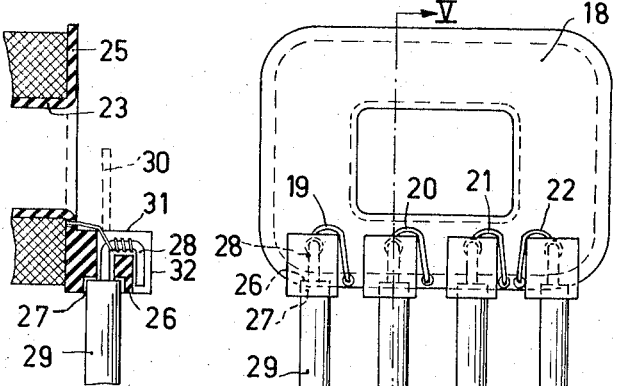
FIG. 5 shows a further embodiment of a coil with the connection of FIG. 3 in a sectional view taken generally on the line V—V in FIG. 6 before the lug is deformed and FIG. 6 is a front view of the coil of FIG. 5 after the lug has been deformed.
Figure 6:
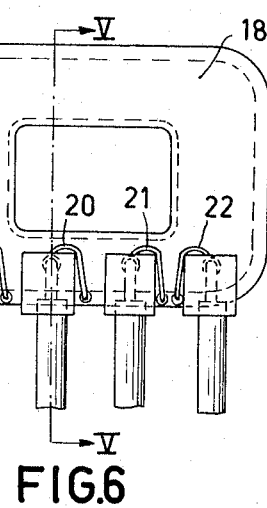

In the embodiment shown in FIGS. 5 and 6, a coil 18 has four wire terminals 19, 20, 21 and 22, including two tappings. The coil former body of polyamide material, for example nylon, is formed by a rectangular body 23 and two flanges 24 and 25. The flange 25 has four identical lugs 26. These lugs each have two coaxial openings 27 and 28, contiguous with one another. The opening 27 has the same diameter as the diameter of connecting wire 29 plus the insulation and the diameter of the opening 28 is about equal to the diameter of the conductive core of the wire 29. During assembly, the end of the wire 29, free of insulation, is taken through the openings 27 and 28 until the insulation bottoms in bore 27. This core end is then located as is indicated in broken lines at 30. Then this end 30 is wrapped with turns of the end 19 of the coil and bent over, so that the wound end 30 can be arranged in a groove 31 provided in the lug. Then the end 30 is again bent over and is arranged in the groove 32. After soldering the wrapped end 30 and softening of the edges of the grooves 31 and 32, these edges may be pressed around the wrapping or they flow automatically around the wrapping so that after cooling a very satisfactory anchorage is obtained.

The lugs described above are not necessary. If one of the flanges 5 or 25 is made sufficiently thick the anchorage may be obtained in the flange itself. However, such manufacture is more difficult and more expensive. If desired, the method described above may be carried out in two steps. The thin wire is wound around the thick one, bent over and disposed in the groove 31. Soldering is carried out and the soldering area is anchored in the groove 31. Subsequently, the wire is bent over and disposed in the groove 32. Then all lugs are put on a hot plate so that the grooves 32 are closed by flow of material.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention with the scope of the appended claims.

What is claimed to be new and useful and secured by Letters Patent of the United States is:

1. The combination comprising a coil of fine wire wound about a coil former having at least one flange of thermoplastic material, a free end portion of said coil wire extending from said coil, a connecting wire having an exposed core, said free end portion of said fine wire being wrapped about said exposed core, a first means for anchoring said connecting wire on said flange, a lug of thermoplastic material connected with said flange adjacent said first means, said wrapped core substantially abutting said lug, a solder joint connecting the fine wire wrapped about said core and a solidified melt of said lug connecting said solder joint with said lug.

2. The combination according to claim 1 wherein said coil comprises the field coil of an electric motor and said connecting wire comprises the lead-in wire for said field coil.

3. The combination according to claim 1 wherein said coil former comprises a core portion about which said coil is wound, a flange of thermoplastic material orthogonal with said core portion at one end thereof, said lug being integral with said flange, said lug having an opening, said opening extending therethrough parallel with said flange, a pair of orthogonal adjoining grooves opening outwardly of said lug, and one of said grooves adjoining said opening, said core entering said opening and being disposed in said grooves with said wrapper wire.

4. A method of connecting a fine wire coil wound on a coil former having a free end extending therefrom and a relatively large connecting wire having an exposed core; said coil former having a thermoplastic flange connected with said coil former, the steps comprising anchoring said connecting wire on said flange, wrapping the free end of the coil wire about the exposed core of said connecting wire, securing the wrapped wires by soldering or welding, and simultaneously with said securing step of melting a portion of the flange so that the melt solidifies on the wrapped wires for further anchoring said connecting wire on said flange.

References Cited by the Examiner

UNITED STATES PATENTS

| | | | |
|---|---|---|---|
| 1,585,017 | 5/1926 | Campbell | 336—192 |
| 2,205,189 | 6/1940 | Edwards | 336—192 X |
| 2,511,693 | 6/1950 | Burghoff | 336—192 X |
| 2,999,962 | 9/1961 | Wahl | 336—192 X |

LEWIS H. MYERS, *Primary Examiner.*

T. J. KOZMA, *Assistant Examiner.*